US005801913A

United States Patent [19]

Pittel

[11] Patent Number: 5,801,913

[45] Date of Patent: Sep. 1, 1998

[54] ISOLATION CIRCUITRY

[75] Inventor: Arkady Pittel, Brookline, Mass.

[73] Assignee: Kiddie-Fenwal, Inc., Ashland, Mass.

[21] Appl. No.: 641,030

[22] Filed: Apr. 29, 1996

[51] Int. Cl.$^6$ .......... H02H 3/00

[52] U.S. Cl. .......... 361/71; 361/93; 361/115; 307/116

[58] Field of Search .......... 361/93, 56, 58, 361/115, 119, 71; 307/116

[56] References Cited

U.S. PATENT DOCUMENTS

| | | | |
|---|---|---|---|
| Re. 28,958 | 9/1976 | Zafiropulo et al. | 340/147 SC |
| Re. 34,643 | 6/1994 | Payne | 361/62 |
| 2,354,138 | 7/1944 | Parsons | 361/62 |
| 2,525,527 | 10/1950 | Dannenberg | 361/62 |
| 2,595,032 | 4/1952 | Wensley | 361/67 |
| 3,652,798 | 3/1972 | McNeilly et al. | 179/15 AL |
| 4,232,232 | 11/1980 | DeLacy | 307/139 |
| 4,290,055 | 9/1981 | Furney et al. | 340/518 |
| 4,359,721 | 11/1982 | Galvin et al. | 340/525 |
| 4,369,435 | 1/1983 | Adachi et al. | 340/506 |
| 4,394,655 | 7/1983 | Wynne et al. | 340/825.36 |
| 4,404,548 | 9/1983 | Müller et al. | 340/505 |
| 4,423,410 | 12/1983 | Galvin et al. | 340/525 |
| 4,470,047 | 9/1984 | Vogt et al. | 340/825.36 |
| 4,507,652 | 3/1985 | Vogt et al. | 340/501 |
| 4,541,031 | 9/1985 | Ibbetson | 361/67 |
| 4,568,919 | 2/1986 | Mugglie et al. | 340/518 |
| 4,603,318 | 7/1986 | Philp | 340/310 R |
| 4,612,534 | 9/1986 | Bühler et al. | 340/505 |
| 4,752,698 | 6/1988 | Furuyama | 307/116 |
| 4,755,797 | 7/1988 | Kanaya | 340/506 |
| 4,785,284 | 11/1988 | Kimura | 340/505 |
| 4,864,519 | 9/1989 | Appleby et al. | 364/550 |
| 4,916,432 | 4/1990 | Tice et al. | 340/518 |
| 4,954,809 | 9/1990 | Right et al. | 340/516 |
| 5,083,107 | 1/1992 | Takahashi et al. | 340/506 |
| 5,086,293 | 2/1992 | Takahashi et al. | 340/506 |
| 5,097,259 | 3/1992 | Testa et al. | 340/825.36 |
| 5,117,219 | 5/1992 | Tice et al. | 340/518 |
| 5,168,273 | 12/1992 | Solomon | 340/870.05 |

FOREIGN PATENT DOCUMENTS

| | | | |
|---|---|---|---|
| 042501A1 | 5/1981 | European Pat. Off. | G08B 26/00 |
| 1383777 | 2/1975 | United Kingdom | G08C 25/02 |
| 1567971 | 5/1980 | United Kingdom | H04L 11/08 |

*Primary Examiner*—Jeffrey A. Gaffin
*Assistant Examiner*—Stephen Jackson
*Attorney, Agent, or Firm*—Fish & Richardson P.C.

[57] ABSTRACT

Isolation circuitry for automatically disconnecting a load from a source upon detecting a short and for automatically reconnecting the load to the source after the short circuit clears. The isolation circuitry includes a first node connected to a second node via a first transmission path, and a third node connected to a fourth node via a second transmission path maintained at a different voltage than the first transmission path. There is a switch between the nodes on the first transmission path, and a sensing circuit that is connected between the first and second transmission paths. The sensing circuit includes a current generator that induces a fault indicating current into a load between the first and second transmission paths and monitors the fault indicating current for an increase over a threshold defined by an operating voltage setting circuit when the load impedance falls below a lower limit indicating a short circuit. The sensing circuit provides a control signal to open the switch if a short circuit is detected and to close the switch if a short circuit is not detected.

18 Claims, 2 Drawing Sheets

ISOLATION CIRCUITRY

BACKGROUND OF THE INVENTION

The invention relates to isolation circuitry for automatically disconnecting a load from a source upon detecting a short and for automatically reconnecting the load to the source after the short circuit clears.

In loop circuits, such as fire protection loops and communications loops, it is known to provide circuitry for isolating a section of a loop in the event of a short circuit by setting up a high impedance path, e.g., by switching transistors in the path from low impedance states to high impedance states. E.g., Payne U.S. Reissue Pat. No. 34,643, describes isolation circuitry that places switching transistors in a high impedance state upon sensing a short circuit-induced change in voltage. U.S. Pat. Nos. 3,652,798 and Re. 28,958 also show isolation circuitry.

SUMMARY OF THE INVENTION

In one aspect, the invention features in general, isolation circuitry for automatically disconnecting a load from a source upon detecting a short and for automatically reconnecting the load to the source after the short circuit clears. The isolation circuitry includes a first node connected to a second node via a first transmission path, and a third node connected to a fourth node via a second transmission path maintained at a different voltage than the first transmission path. There is a switch between the nodes on the first transmission path, and a sensing circuit that is connected between the first and second transmission paths. The sensing circuit includes a current generator that induces a fault indicating current into a load between the first and second transmission paths and monitors the fault indicating current for an increase over a threshold when the load impedance falls below a lower limit indicating a short circuit. The sensing circuit provides a control signal to open the switch if a short circuit is detected and to close the switch if a short circuit is not detected.

In preferred embodiments, the sensing circuit includes a short-responsive capacitance that charges up in the absence of a short circuit and discharges in the presence of the fault indicating current and a control element that provides the control signal to the switch depending upon the charge condition of the capacitance. The control element is a sensing transistor, and the short-responsive capacitance includes intrinsic capacitance from the gate to the source of the sensing transistor and a capacitor that is connected between the sensing transistor gate and the first transmission path via a discharge diode that allows the capacitance to discharge in a direction opposite to the direction of charging of the capacitance. The sensing circuit also includes an operating voltage setting circuit including a resistor divider network with one resistor connected in parallel to the intrinsic gate-to-source capacitance of the transistor and the other in parallel to the second capacitor between the transistor gate and discharge diode. The operating voltage setting circuit defines a limit to which the intrinsic capacitance of the sensing transistor charges. The sensing transistor gate is above the threshold voltage for the sensing transistor when the capacitance is charged up and is below the threshold voltage when the capacitance has been discharged. A charging diode is connected between the sensing capacitor and the first transmission path and is conductive in the opposite direction from the discharge diode.

The switch can use a single switching transistor in a unidirectional mode of operation (powered from one side) or can use two switching transistors in a bidirectional operation (powered from either side or both sides). In bidirectional isolation circuitry, two charging diodes and two discharge diodes are used, with one of each being located on each side of the switch.

In another aspect, the invention features in general, isolation circuitry including first and second transmission paths, a switch between the nodes on one of the transmission paths, and a sensing circuit connected between the transmission paths that detects the presence or absence of a short circuit between the transmission paths and controls the switch to open if a short circuit is detected and to close if a short circuit is not detected. The circuitry also includes a light emitting diode that is connected to the sensing circuit and indicates if a short circuit is detected.

In preferred embodiments, the light emitting diode is used to charge a capacitance in the sensing circuit that is responsive to the short circuit condition. In a bidirectional implementation, there are two light emitting diodes, and they indicate the direction of the fault.

Embodiments of the invention may have one or more of the following advantages. The use of capacitance to detect a short circuit condition results in a charging-time delay in connecting the isolation circuitry when powering on. When there are a number of isolation circuitries in a loop, the delay associated with each isolation circuitry causes it to become conductive in sequence. Such sequential connection avoids transients that might otherwise occur if all such units became conductive simultaneously.

Other advantages and features of the invention will be apparent from the following description of the preferred embodiment and from the claims.

DESCRIPTION OF THE PREFERRED EMBODIMENT

Figure 1:
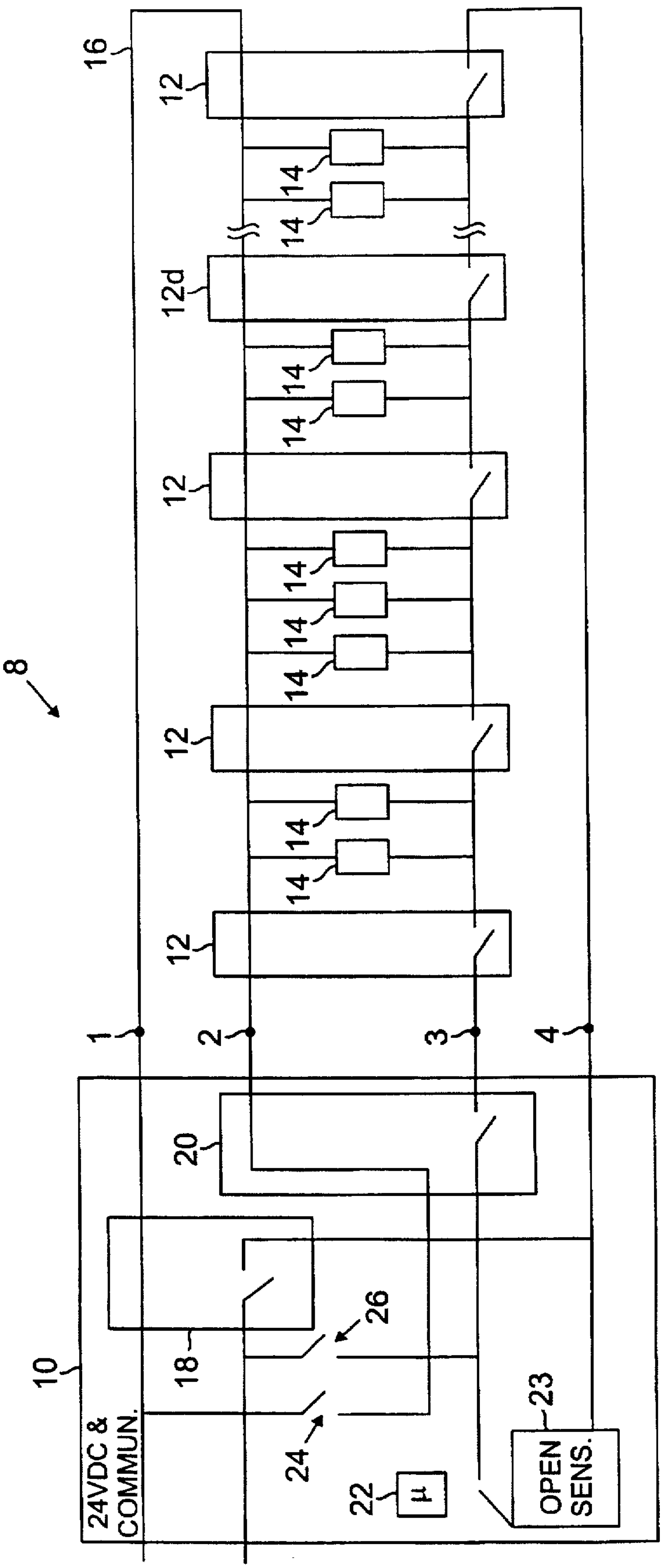
FIG. 1 is a block diagram of loop circuit including isolation circuitry according to the invention.

Referring to FIG. 1, overall fire detector system 8 includes loop controller 10 and a plurality of loop isolators 12 and loop devices 14 connected in the segments of loop 16, which is connected at the ends of the loop to loop controller 10. Loop devices 14 include smoke, fire and temperature and other detectors, and other addressable and non-addressable devices (e.g., release modules having solenoids or explosive initiators and signal modules used to activate horns or strobe lights); they are powered by 24 V provided over loop 16 and communicate over the same conductors by small voltage digital signals interposed over the 24 V DC supply voltage. Loop isolators 12 are bidirectional. Loop controller 10 includes two unidirectional isolators 18, 20, microcontroller 22, open sensor 23, and relays 24, 26.

Figure 2:
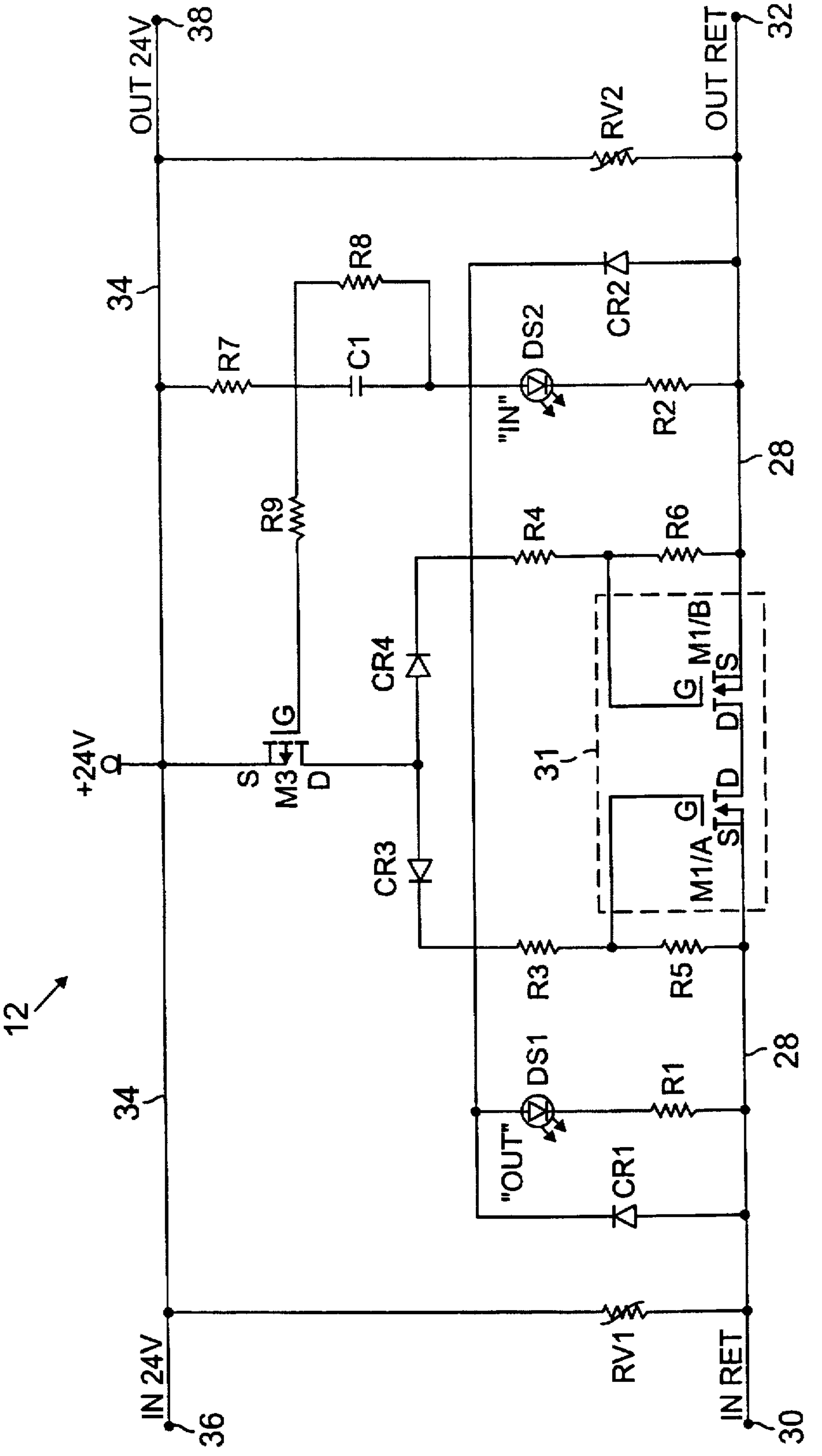
FIG. 2 is a schematic of isolation circuitry according to the invention.

Referring to FIG. 2, loop isolator 12 is shown in detail. It includes first transmission path 28 between first node 30 and second node 32, and second transmission path 34 between third node 36 and fourth node 38. Second transmission path 34 is maintained at 24 V, while first transmission path 28 is a return path to ground. Loop isolator 12 also includes switch 31 along first transmission path 28 that is provided by switching transistors M1A, M1B, the gates of which have voltage dividers provided by resistors R3 and R5 and R4 and R6. Loop isolator 12 also includes a sensing circuit connected between first and second transmission paths 28, 34; the sensing circuit is made up of sensing transistor M3 (having internal capacitance $C_{ig}$ from its gate to its source), short-sensing capacitor C1, operating voltage range setting resistors R7, R8, resistors R1 and R2, and discharge diodes CR1 and CR2. The capacitance of $C_{ig}$ and C1 act as a current generator that induces a fault indicating current into a load between the first and second transmission paths 28, 34. Resistors R7, R8 determine an operating voltage range of the loop isolator, setting a limit to the voltage of the gate-to-source capacitance $C_{ig}$ when it is charged. Transistor M3 effectively monitors the fault indicating current by sensing a voltage on its intrinsic gate to source capacitance Cig for an increase in current (decrease in voltage) with respect to a threshold when the load impedance falls below a lower limit indicating a short circuit. Transistor M3 provides a control signal to the gates of switching transistors M1A and M1B to open if a short circuit is detected and to close or stay closed if a short circuit is not detected. Loop isolator 12 is a symmetrical circuit that responds to short circuit impedances between transmission paths 28, 34 on either side.

Loop isolator 12 includes the following components:

| | |
|---|---|
| resistors | |
| R1 | 3K |
| R2 | 3K |
| R3 | 36K |
| R4 | 36K |
| R5 | 15K |
| R6 | 15K |
| R7 | 7.5M |
| R8 | 10M |
| voltage suppressors | |
| RV1 | VC121030H620 |
| RV2 | VC121030H620 |
| diodes | |
| CR1 | BAS16LT1 |
| CR2 | BAS16LT1 |
| CR3 | BAS16LT1 |
| CR4 | BAS16LT1 |
| light emitting diodes | |
| DS1 | HLMP3416 |
| DS2 | HLMP3416 |
| transistors | |
| M1A,M1B | Si9945DY |
| M3 | Si9407DY |

Internal unidirectional isolators 18, 20 are identical to loop isolators 12 except that they are each missing some components needed for bidirectional operation and are therefore unidirectional. In particular, unidirectional isolators 18, 20 do not have discharge diode CR1 and charging LED DS2. In addition, the unidirectional isolators could also operate with a single switching transistor.

Referring to FIG. 1, the operation will now be described. Loop controller 10 supplies power and communication signals to the loop devices 14. On power up of system 8, the contacts of relays 24, 26 are initially open, and connection 1 supplies DC voltage, while connection 4 returns DC current back to loop controller 10. Prior to any fault condition, connections 2 and 3 of loop controller 10 are used to sense the presence of DC voltage at the end of the loop at internal loop isolator 20. When DC voltage disappears across connections 2 and 3, it is detected by open sensor 23 and microcontroller 22, and loop controller 10 reports the open on the loop, e.g., to a host computer (not shown).

If there is a short anywhere along loop 16, all loop isolators 12 disconnect at the same time, changing from conditions of low impedance between terminals 30 and 32 (in the normal mode) to conditions of high impedance between terminals (in the disconnected mode). There is a delay between the short circuit condition and disconnection of loop isolators 12, e.g., approximately 10–200 microseconds, which provides a current overload condition sufficiently long in time to be detected by microcontroller 22 in loop controller 10. The short is sensed by capacitors (e.g., $C_{ig}$ and C1) in loop isolators 12 that discharge through the short circuit impedance. Loop controller 10 does not initially know where the short is located. Loop controller 10 continues to provide power at the originally connected end of the loop (terminals 1 and 4), and the loop devices and loop isolators at this end of the loop (those on the right side on FIG. 1) are automatically reconnected, beginning with unidirectional isolator 18 and the isolators closest electrically to loop controller 10, i.e., the one to the far right in FIG. 1. Upon sensing the short, loop controller 10 begins to provide power first to unidirectional loop isolator 20 by closing the contacts of relays 24, 26 and then to the other end of the loop (terminals 2 and 3; left side of loop), and the loop devices 14 and loop isolators 12 also begin to be connected from this end, starting with the left-most in FIG. 1.

At each end of the loop, capacitance ($C_{ig}$ and C1) in the loop isolator 12 closest to loop controller 10 first charges up slowly, and, when the charge voltage rises to a threshold level (i.e., for M3), isolator 12 switches to the low impedance condition, connecting the loop devices on the side remote from controller 10, and providing DC voltage and communication to the adjacent loop devices and next isolator, which begins to charge up slowly, and so on until the isolator next to short is reached. The short prevents the capacitance in that isolator from charging to a threshold level. If there is, for example, a short between the two isolators 12 at the right-hand side of FIG. 1, then all loop devices 14 between these two isolators will remain disconnected. An advantage of the sequential reconnection is that transients are avoided that could occur if all isolators were going through a connect-disconnect process all at the same time creating current surges on the loop with all loop devices powering up at the same time. Loop devices 14 report to loop controller 10 as they are reconnected, permitting loop controller 10 to identify the location of the fault. Only those devices 14 in the segment between isolators including the short are not powered, as the devices to the right of the segment with the short are powered from nodes 1 and 4, and the devices to the left of the segment with the short are powered from nodes 2 and 3. When operating in this mode (with power coming from all node pairs 1, 4 and 2, 3 of loop controller 10) open sensor 23 is unable to detect open circuits. As soon as the fault condition is removed, devices 14 in the segment that had the fault will be automatically resupplied with power and communication signals from the adjacent loop isolators 12. Upon reconnection, devices 14 will report to loop controller 10, which will then discontinue supply of power from nodes 2, 3 by opening the contacts of relays 24, 26, permitting open sensor 23 to once again detect open conditions on the loop.

Referring to FIG. 2, the operation of a loop isolator 12 will be described. Originally, before any power is applied, the gate of transistor M3 is at the same floating voltage as the rail, 24 V. Therefore transistor M3 is closed; and transistors M1A and M1B are closed, providing high impedance paths between the left side and right side of loop isolator circuitry 12. When powered on from, e.g., the left side (nodes 30, and 36), capacitors C1 and $C_{ig}$ are charged up through charging LED DS1 and resistor R1. (If powered from the other side, the capacitors will be charged through charging LED DS2 and resistor R2.) As the capacitors are charged up, the voltage at the gate of transistor M3 goes above the threshold to the level set up by the resistor divider R7, R8, that determines the operating voltage range of the loop isolator. The transistor M3 opens, permitting voltages at the gates of transistors M1A and M1B through voltage dividers (R3 and R5; R4 and R6) to go over the threshold, closing these "switches" and providing low impedance paths through loop isolator circuitry 12 to the detectors 14 and loop isolator circuits 12 to the right. In normal conditions, i.e., when there is no charging current through capacitors, both LEDs DS1 and DS2 are off. If a short circuit condition is present on the right-hand side, capacitor $C_{ig}$ cannot effectively be charged up, as both capacitors $C_{ig}$ and C1 are effectively discharging through diode CR2 and the low impedance path of the short; detectors to the right of the isolator thus will not receive power. The capacitors $C_{ig}$ and C1 attempt to charge up through charging LED DS1 and R1. The LED DS1 ("OUT") illuminates when conducting the charging current, identifying the direction of the short circuit.

If an isolator 12 is in a normal, low impedance condition, and then a short circuit develops on the right-hand side, the capacitors C1 and $C_{ig}$ discharge through the short going through discharge diode CR2 quicker than the time it took the capacitors to charge up through charging LED DS1 and resistor R1. The voltage at the gate of transistor M3 rises to the supply voltage level; transistor M3 disconnects, and transistors M1A and M1B similarly disconnect, providing a high impedance path. Now loop isolator 12 is in the high impedance state. The short circuit is sensed by all isolators 12 simultaneously, as noted above.

Other embodiments of the invention are within the scope of the appended claims.

What is claimed is:

1. Isolation circuitry for automatically disconnecting a load from a source upon detecting a short and for automatically reconnecting the load to the source after the short circuit clears, said circuitry comprising, a first node connected to a second node via a first transmission path, a third node connected to a fourth node via a second transmission path maintained at a different voltage than said first transmission path, a switch between said nodes on said first transmission path, a sensing circuit connected between said first and second transmission paths that includes a current generator that induces a fault indicating current into a load between said first and second transmission paths and monitors the fault indicating current for an increase over a threshold when the load impedance falls below a lower limit indicating a short circuit, said sensing circuit providing a control signal to said switch to open if a short circuit is detected and to close if a short circuit is not detected, and wherein said current generator of said sensing circuit includes short responsive capacitance in the current generator that charges up in the absence of a short circuit impedance between said first and second transmission paths and discharges in the presence of said fault indicating current and a control element that provides said control signal depending upon the charge condition of said capacitance.

2. The isolation circuitry of claim 1 wherein said switch includes a first switching transistor having a first switching transistor gate, and said control signal is provided to said first switching transistor gate.

3. The isolation circuitry of claim 2 wherein said switch includes a second switching transistor having a second switching transistor gate, and said control signal is provided to said second switching transistor gate.

4. The isolation circuitry of claim 1 wherein said control element is a sensing transistor having a sensing transistor gate and a sensing transistor source, and wherein said short responsive capacitance includes intrinsic capacitance from said sensing transistor gate to said sensing transistor source.

5. The isolation circuitry of claim 4 wherein said sensing circuit includes an operating voltage setting circuit including a resistor divider network including a resistor connected in parallel to the short responsive capacitance, said operating voltage setting circuit defining a limit to which the said intrinsic capacitance of the sensing transistor charges.

6. The isolation circuitry of claim 4 wherein said sensing circuit includes a first discharge diode, and said short responsive capacitance includes a short sensing capacitor connected between said sensing transistor gate and said first transmission path via said first discharge diode, said first discharge diode allowing said capacitance to discharge in a direction opposite to the direction of charging of said capacitance, and wherein said sensing transistor gate is above the threshold voltage for said sensing transistor when said capacitance is charged up and is below said threshold voltage when said capacitance has been discharged.

7. The isolation circuitry of claim 6 further comprising a first charging diode connected between said sensing capacitor and said first transmission path, said first charging diode being conductive in the opposite direction from said first discharge diode.

8. The isolation circuitry of claim 7 wherein said first charging diode is a light emitting diode that indicates the presence of a short circuit.

9. The isolation circuitry of claim 7 wherein said first charging diode and first discharge diode are connected to said first transmission path on opposite sides of said switch, and said sensing circuit includes a second discharge diode, and further comprising a second charging diode, said second discharge diode and said second charging diode being connected between said sensing capacitor and said first transmission path, said second discharge diode being connected to the same side of said switch as said first charging diode, and said second charging diode being connected to the same side of said switch as said first discharge diode.

10. The isolation circuitry of claim 9 wherein said first and second charging diodes are first and second light emitting diodes, said first light emitting diode indicating a short circuit between said second and fourth nodes, said second light emitting diode indicating a short circuit between said first and third nodes.

11. The isolation circuitry of claim 9 further comprising a first resistor connected in series with said first charging diode, and a second resistor connected in series with said second charging diode.

12. Isolation circuitry for automatically disconnecting a load from a source upon detecting a short and for automatically reconnecting the load to the source after the short circuit clears, said circuitry comprising, a first node connected to a second node via a first transmission path, a third node connected to a fourth node via a second transmission path maintained at a different voltage than said first transmission path, a switch between said nodes on said first transmission path, a sensing circuit connected between said first and second transmission paths that detects the presence or absence of a short circuit between said first and second transmission paths, said sensing circuit providing a control signal to said switch to open if a short circuit is detected and to close if a short circuit is not detected, a light emitting diode connected to said sensing circuit to indicate if a short circuit is detected, and wherein said sensing circuit includes short responsive capacitance in the sensing circuit that charges up in the absence of a short circuit impedance between said first and second transmission paths and discharges in the presence of a short circuit impedance between said first and second transmission paths and a control element that provides said control signal depending upon the charge condition of said capacitance, said light emitting diode being connected to charge said capacitance.

13. The isolation circuitry of claim 12 wherein said control element is a sensing transistor having a sensing transistor gate and a sensing transistor source, and wherein said short responsive capacitance includes intrinsic capacitance from said sensing transistor gate to said sensing transistor source.

14. A loop system comprising a plurality of isolation circuitries, each comprising a first node connected to a second node via a first transmission path, a third node connected to a fourth node via a second transmission path maintained at a different voltage than said first transmission path, a switch between said nodes on said first transmission path, and a sensing circuit connected between said first and second transmission paths that includes a current generator that induces a fault indicating current into a load between said first and second transmission paths and monitors the fault indicating current for an increase over a threshold when the load impedance falls below a lower limit indicating a short circuit, said sensing circuit providing a control signal to said switch to open if a short circuit is detected and to close if a short circuit is not detected, said isolation circuitries being connected in a loop, a plurality of loop devices connected between said transmission paths along said loop, a loop controller connected to said transmission paths to provide power to and communicate with said loop devices on said loop, and wherein each said fault generator of said sensing circuit includes short responsive capacitance that charges up in the absence of a short circuit impedance between said first and second transmission paths and discharges in the presence of said fault indicating current and a control element that provides said control signal depending upon the charge condition of said capacitance.

15. A loop system comprising a plurality of isolation circuitries, each comprising a first node connected to a second node via a first transmission path, a third node connected to a fourth node via a second transmission path maintained at a different voltage than said first transmission path, a switch between said nodes on said first transmission path, and a sensing circuit connected between said first and second transmission paths that includes a current generator that induces a fault indicating current into a load between said first and second transmission paths and monitors the fault indicating current for an increase over a threshold when the load impedance falls below a lower limit indicating a short circuit, said sensing circuit providing a control signal to said switch to open if a short circuit is detected and to close if a short circuit is not detected, said isolation circuitries being connected in a loop, a plurality of loop devices connected between said transmission paths along said loop, and a loop controller connected to said transmission paths to provide power to and communicate with said loop devices on said loop, and wherein said system is a fire protection system and said loop devices include smoke, fire, or temperature detectors.

16. The system of claim 15 wherein loop devices include release modules or signal modules.

17. A method of automatically disconnecting a load from a source upon detecting a short and for automatically reconnecting the load to the source after the short circuit clears, said method comprising providing isolation circuitry including first and second transmission paths connected between said source and said load and maintained at different voltage levels, a switch between a node connected to said source and a node connected to said load on said first transmission path, and a sensing circuit that is connected between said first and second transmission paths and includes a current generator, inducing a fault indicating current by said current generator into a load between said first and second transmission paths, monitoring said fault indicating current for an increase over a threshold when the load impedance falls below a lower limit indicating a short circuit, providing a control signal from said sensing circuit to said switch to open if a short circuit is detected and to close if a short circuit is not detected, opening or closing said switch in response to said control signal, wherein said current generator of said sensing circuit includes short responsive capacitance and a control element, and wherein said detecting includes charging up said capacitance in the absence of a short circuit impedance between said first and second transmission paths and discharging said capacitance in the presence of said fault indicating current, and wherein said control signal is provided by said control element depending upon the charge condition of said capacitance.

18. A method of automatically disconnecting a load from a source upon detecting a short and for automatically reconnecting the load to the source after the short circuit clears, said method comprising providing isolation circuitry including first and second transmission paths connected between said source and said load and maintained at different voltage levels, a switch between a node connected to said source and a node connected to said load on said first transmission path, and a sensing circuit that is connected between said first and second transmission paths and includes a current generator, inducing a fault indicating current by said current generator into a load between said first and second transmission paths, monitoring said fault indicating current for an increase over a threshold when the load impedance falls below a lower limit indicating a short circuit, providing a control signal from said sensing circuit to said switch to open if a short circuit is detected and to close if a short circuit is not detected, and opening or closing said switch in response to said control signal, wherein said providing includes providing a plurality of said isolation circuitries in a loop including a loop controller and a plurality of loop devices that are connected between said transmission paths along said loop and are powered by and communicate with said loop controller, and wherein said switches in said isolation circuitries after being open, close in sequence beginning with the circuitries electrically closest to said loop controller.

* * * * *

UNITED STATES PATENT AND TRADEMARK OFFICE
CERTIFICATE OF CORRECTION

PATENT NO. : 5,801,913

DATED : SEPTEMBER 1, 1998

INVENTOR(S) : ARKADAY PITTEL

It is certified that error appears in the above-identified patent and that said Letters Patent is hereby corrected as shown below:

Cover Page, Item [73], replace "Kiddie-Fenwal, Inc.," with --Kidde-Fenwal, Inc..--

Signed and Sealed this

Twenty-ninth Day of May, 2001

Attest:

NICHOLAS P. GODICI

*Attesting Officer*

*Acting Director of the United States Patent and Trademark Office*